E. A. HITCH.
TIRE PROTECTOR.
APPLICATION FILED AUG. 6, 1921.
1,426,191.
Patented Aug. 15, 1922.
2 SHEETS—SHEET 2.
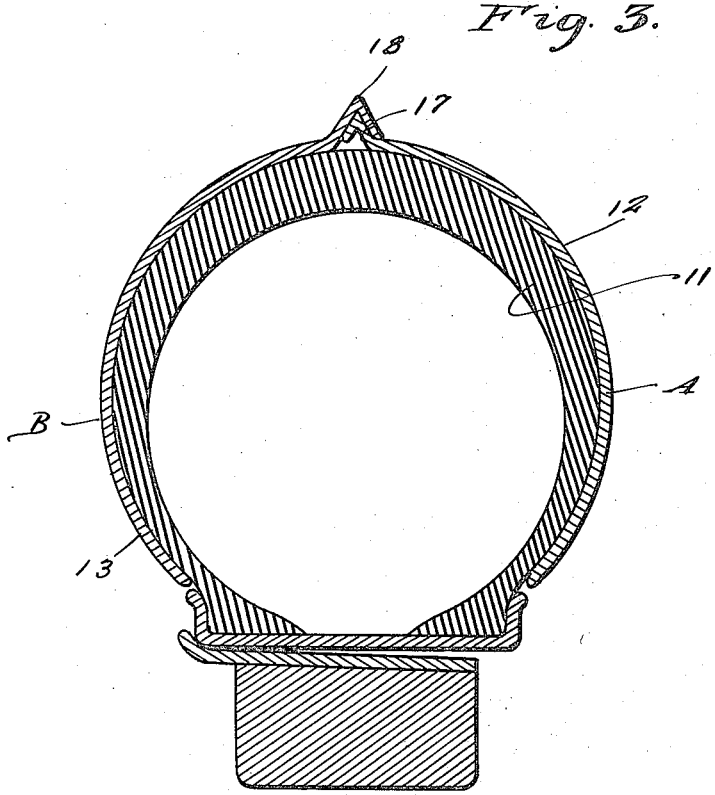
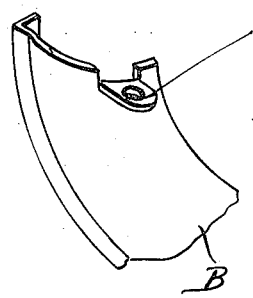
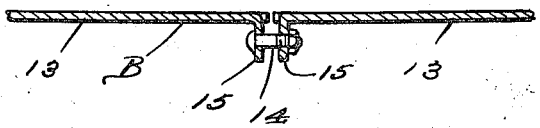
Elias A. Hitch INVENTOR

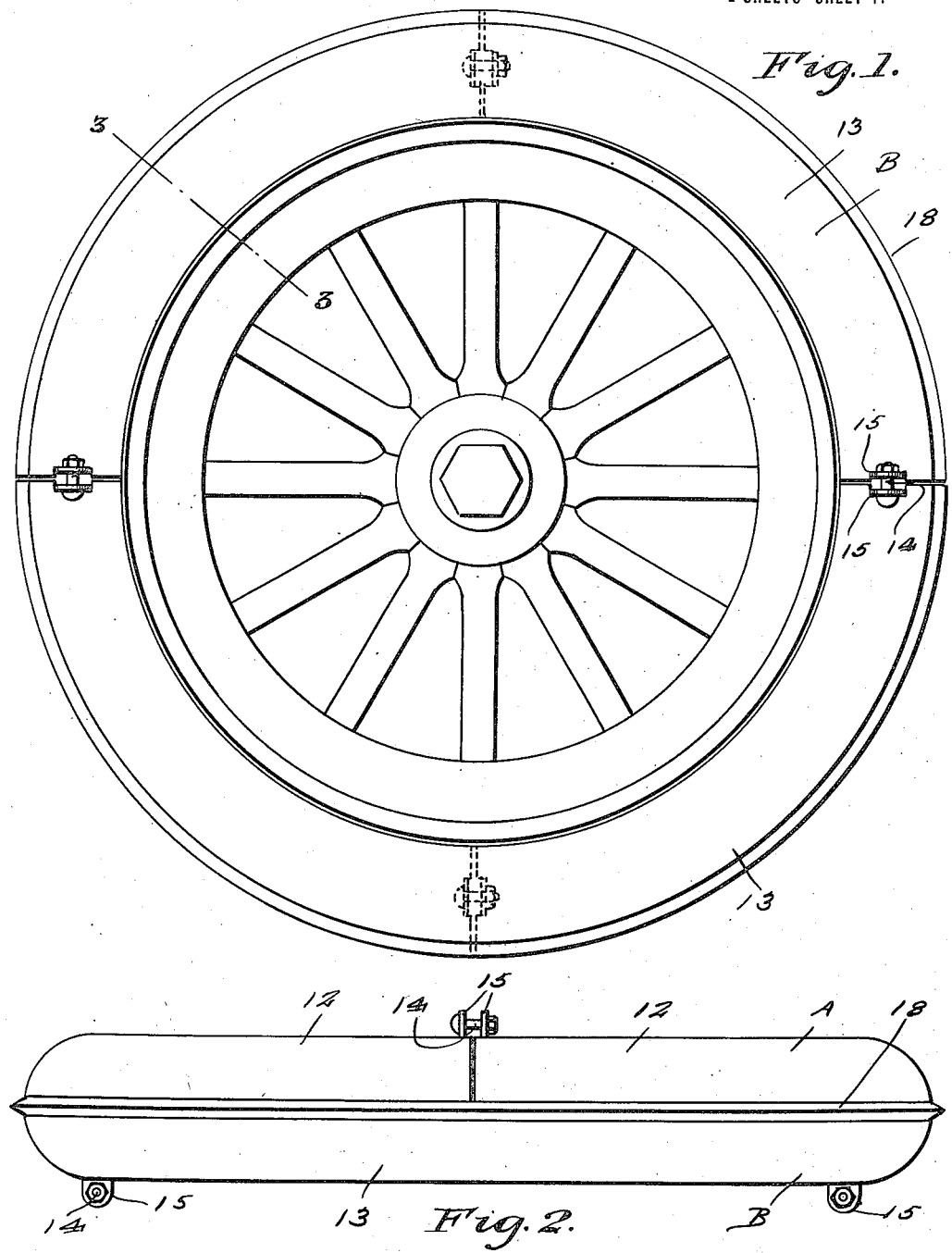

UNITED STATES PATENT OFFICE.

ELIAS A. HITCH, OF GUYMON, OKLAHOMA.

TIRE PROTECTOR.

1,426,191.

Specification of Letters Patent.   Patented Aug. 15, 1922.

Application filed August 6, 1921. Serial No. 490,246.

*To all whom it may concern:*

Be it known that I, ELIAS A. HITCH, a citizen of the United States, residing at Guymon, in the county of Texas and State of Oklahoma, have invented new and useful Improvements in Tire Protectors, of which the following is a specification.

This invention comprehends the provision of a pneumatic tire protector, designed to cover the tire to prevent puncture of the latter, and also to assist in preventing skidding of the machine upon which the tire is mounted.

More specifically stated, the protector is made up of opposed side members adapted to unitedly define a protector for the tire, the members being divided into sections, with the corresponding sections of the respective members formed with outstanding flanges and channel-shaped portions to receive the flanges in the production of a circumferential rib adapted to surround the tread of the tire to prevent skidding.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views and wherein:—

Figure 1 is a side elevation of a wheel equipped with a tire and protector constructed in accordance with the present invention.

Figure 2 is a fragmentary plan view of the protector.

Figure 3 is a transverse sectional view taken on line 3—3 of Figure 1.

Figure 4 is a perspective view of one section of one of the side members.

Figure 5 is a perspective view of the corresponding section of the other side member.

Referring to the drawings in detail, 10 indicates a tire carrying rim of any well known construction upon which is arranged the pneumatic tire 11.

The protector forming the subject matter of the present invention comprises two side members A and B respectively, these members being arranged at the opposed sides of the tire 11 and constructed to unitedly define a protector for the tire which completely encloses the latter. Each member is made up of a plurality of sections, the sections of the member A being indicated at 12 and the sections of the member B being indicated at 13. The adjacent ends of the respective units provided by the corresponding sections of the respective members are arranged in overlapped relation as illustrated in Figure 3, and these units are secured together in any suitable manner, preferably by means of fastening bolts 14 which are passed through apertured lugs 15 projecting from the ends of the units as illustrated. Each section 12 of the member A terminates to provide an outstanding flange 17 which when the sections are associated with the tire 11 are arranged centrally of the tread of the tire. Each section 12 of the member B terminates to provide a substantially channel-shaped portion 18 which may be of any suitable cross sectional configuration, and which channel-shaped portion of each section receives the outstanding flange 17 of the corresponding section of the member A. In this manner, the corresponding sections of each unit of the protector are interlocked, with the interlocking means consisting of the flange 17 and the channel-shaped portion 18 producing a rib which is arranged circumferentially about the tread in order to prevent skidding of the machine upon which the tire is mounted. The protector is not only useful in this respect, but it also protects the tire from being punctured or otherwise injured. The protector is simple in construction, and can be easily and conveniently applied to the tire or removed therefrom as the occasion may require.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:—

1. A pneumatic tire protector comprising opposed side members, each member being divided into a plurality of sections, means for interlocking the corresponding sections of the respective members and define a rib arranged circumferentially of the tire for the purpose specified, and means for securing the sections of each member together.

2. A pneumatic tire protector comprising opposed side members designed to unitedly embrace the tire, each member being divided into a plurality of sections, means for securing the sections of each member together, each section of one member being formed to provide an outstanding flange, channel-shaped portions formed on the sections of the other member and arranged to receive said flanges, whereby a circumferential rib is formed about the tread of the tire for the purpose specified.

3. A pneumatic tire protector comprising opposed side members designed to unitedly embrace the tire, each member being divided into a plurality of sections, interlocking means connecting the corresponding sections of the respective members and forming a rib extended circumferentially about the tread of the tire, the units defined by the corresponding sections of the respective members having their opposed ends overlapped, and means for securing the units together.

4. A tire protector comprising opposed side members designed to unitedly embrace the tire, each member being divided into a plurality of sections, lugs projecting from the sections of each member, fastening elements passed through said lugs for securing the sections together, a flange projecting from each section of one member, and a channel-shaped portion projecting from each section of the other member and arranged to receive said flanges, whereby a circumferential rib is produced by the tread of the tire for the purpose specified.

In testimony whereof I affix my signature.

ELIAS A. HITCH.